United States Patent [19]

Noguchi

[11] 4,281,889
[45] Aug. 4, 1981

[54] LIGHT BEAM SCANNING SYSTEM

[75] Inventor: Masaru Noguchi, Asaka, Japan

[73] Assignee: Fuji Photo Film Co., Ltd., Minami-ashigara, Japan

[21] Appl. No.: 84,342

[22] Filed: Oct. 12, 1979

[30] Foreign Application Priority Data

Oct. 19, 1978 [JP] Japan ................ 53-128884

[51] Int. Cl.³ .......................................... G02B 21/00
[52] U.S. Cl. .................................................. 350/6.8
[58] Field of Search ............... 350/6.8, 3.71, 7, 9, 350/285; 250/236; 358/199

[56] References Cited

U.S. PATENT DOCUMENTS

| | | | |
|---|---|---|---|
| 3,623,789 | 11/1971 | Kawaszu | 350/9 |
| 3,865,465 | 2/1975 | Tutuoka et al. | 350/6.8 |
| 3,972,582 | 8/1976 | Oosaka et al. | 350/3.71 |
| 4,054,361 | 10/1977 | Noguchi | 350/6.8 |
| 4,073,566 | 2/1978 | Noguchi | 350/6.8 |
| 4,121,883 | 10/1978 | Goshima et al. | 350/6.8 |
| 4,123,135 | 10/1978 | Rabedeau | 350/6.8 |

*Primary Examiner*—John K. Corbin
*Assistant Examiner*—B. W. de los Reyes
*Attorney, Agent, or Firm*—Sughrue, Mion, Zinn, Macpeak and Seas

[57] ABSTRACT

A light beam scanning system in which deviations perpendicular to the scanning direction of the scan line due to parallelism deviations of a rotary multi-surfaced mirror are eliminated. A first linear image pattern is formed on the reflecting surface of the mirror parallel to the scanning direction by a connex cylindrical lens. The image is reflected to a first convergent lens which forms a second linear image perpendicular to the scanning direction then passes through a concave cylindrical lens which diverges the light in a direction perpendicular to the scanning direction. A second convergent lens converges the beam to form a point image on the scanned surface.

3 Claims, 6 Drawing Figures

PRIOR ART
FIG. 1A
FIG. 1B
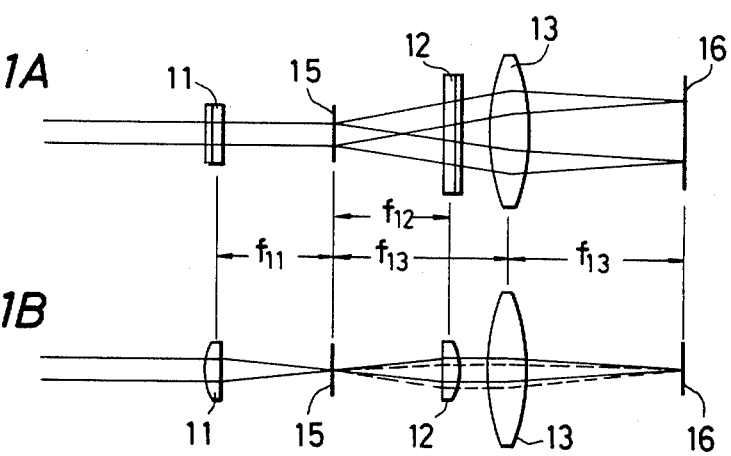
PRIOR ART
FIG. 2A
FIG. 2B
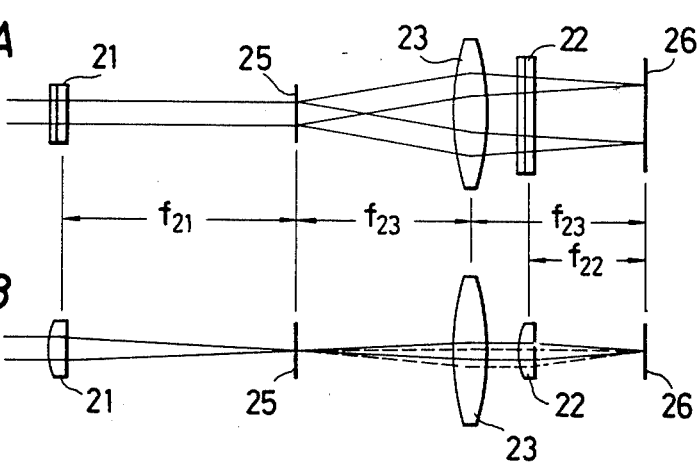

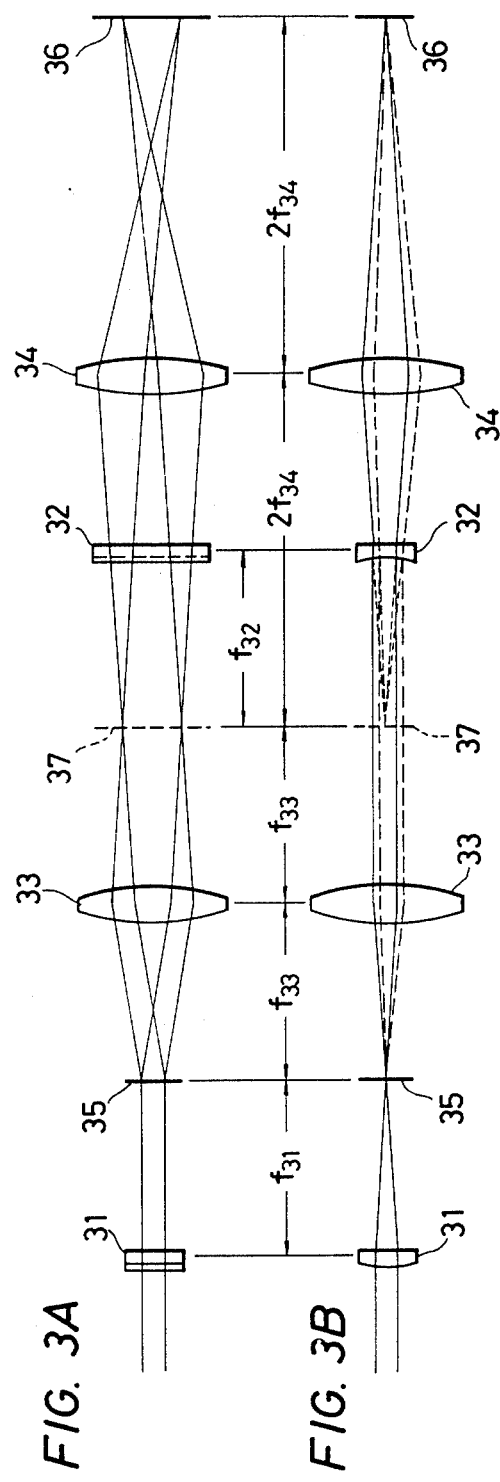

LIGHT BEAM SCANNING SYSTEM

BACKGROUND OF THE INVENTION

The present invention relates to an improvements in a light beam scanning system utilizing a rotary multi-surfaced mirror.

Recently, a number of devices have been developed for reading and recording information using a scanning light beam such as laser beams. A rotary multi-surfaced or faceted mirror is typically employed as a light deflector in such devices. However, deviations from a perfect parallel state often exist between the rotary shaft and the reflecting surfaces of such a mirror even if the components are manufactured with high precision. Such errors cause the scanning beam to be undersirably displaced perpendicular to its deflection direction. That is, the loci of the scanned light beams on the image plane due to reflection by the various surfaces of the rotary multi-surfaced mirror form not a straight, narrow line but instead a line with a significant deviation therefrom.

Methods for forming coincident scan lines by optically correcting lateral displacement caused by parallelism imperfections have been proposed. As an example Japanese Patent Publication No. 52-28666 discloses a method such as illustrated here in FIGS. 1(A) and 1(B) which are exploded views illustrating the method of this publication. FIGS. 1(A) and 1(B) show, respectively, states of a light beam via a rotary multisurfaced mirror in a scanning direction of the light beam and in a direction perpendicular to the scanning direction. According to this method, the light beam is converged only in a direction perpendicular to its scanning direction by a rotary multisurfaced mirror by using a cylindrical lens 11 to thereby form a linear image in the scanning direction on a reflecting surface 15. The light beam reflected by the reflecting surface is collimated by collimated by a second cylindrical lens 12 and finally a point image is formed on a scanning surface 16 by a convergent lens 13. In this case, as viewed in a direction perpendicular to the scanning direction of the light beam, a conjugate relationship between the object and image points is established between the linear image on the reflecting surface 15 and the point image focussed on the scanning surface 16. Even if the direction of the light beam reflected by the reflecting surface 15 is changed due to the parallelism deviations, the light beam is converged at a constant position on the scanning surface 16. Thus, the loci of the scan lines are made coincident with each other.

Since the second cylindrical lens 12 is disposed between the reflecting surface 15 and the convergent lens 13, the following relationship must be established:

$$f_{12} < f_{13}. \tag{1a}$$

Furthermore, in order to form a locus of the point image focussed on the scanning surface as a circle the following relationship must be established:

$$f_{11} = f_{12}, \tag{1b}$$

where $f_{11}$ and $f_{12}$ are the focal lengths of the first and second cylindrical lenses 11 and 12, respectively, and $f_{13}$ is the focal length of the convergent lens 13.

Both focal lengths $f_{11}$ and $f_{12}$ of the first and second cylindrical lenses must be shorter than the focal length $f_{13}$ of the convergent lens. For example, when $f_{13} = 50$ mm, $f_{11}$ and $f_{12}$ become about 30 to 35 mm. It is very difficult to manufacture such short focal length cylindrical lenses of a high quality. Also, if the focal length $f_{11}$ of the first cylindrical lens is shortened to this extent, since the depth of focus thereof is narrow, the convergence of the light beam on the scanning surface 16 is varied due to the displacement of the reflecting surface 15.

Laid Open Japanese Utility Model Application No. 53-91845 discloses a method for eliminating the above-described disadvantage. This method is illustrated by an exploded view shown in FIGS. 2(A) and 2(B). FIGS. 2(A) and 2(B) show states of the light beam in the scanning direction of the rotary multi-surfaced mirror and in a direction perpendicular to the scanning direction. According to this method, the light beam is converged by a first cylindrical lens 21 only in a direction perpendicular to the scanning direction of the light beam from a rotary multi-surfaced mirror. A linear image is formed on a reflecting surface 25 of the rotary multi-surfaced mirror in parallel with the scanning direction and the light beam reflected by the reflecting surface 25 is again converged by a convergent lens 23 and a second cylindrical lens 22 to thereby form point images on a scanning surface 26. This method is different from that disclosed in the above-mentioned Japanese Patent Publication No. 52-28666 in that the second cylindrical lens 22 thereof is disposed behind the convergent lens 23. However, both methods are essentially the same in theory in that although the direction of the light beam reflected by the reflecting surface is varied due to the aforementioned parallelism errors, the light beam is focussed on a constant position on the scanning surface 26 with loci of the scan lines coincident with each other at all times.

Since the second cylindrical lens 22 is disposed between the convergent lens 23 and the scanning surface 26, the following inequality must be established:

$$f_{22} < f_{23}. \tag{2a}$$

Moreover, in order to form a locus of a point images focussed on the scanning surface 26 along a circle, the following relationship must be established:

$$f_{21} \cdot f_{22} = f_{23}^2, \tag{2b}$$

where $f_{21}$ and $f_{22}$ are the focal lengths of the first and second cylindrical lenses 21 and 22, respectively, and $f_{23}$ is the focal length of the convergent lens 23. For example, when $f_{23} = 50$ mm, the focal length $f_{21}$ must be about 83 to 71 mm. That is, the focal length $f_{21}$ of the first cylindrical lens can be rather long to thereby increase the depth of focus. As a result, the variation of the convergence of the light beam on the scanning surface 26 due to displacement of the reflection position of the light beam generated together with the rotation of the reflecting surface can be reduced. However, since the second cylindrical lens must still be a short focal length lens, the above-noted difficulties in manufacturing such a lens of high quality remain.

SUMMARY OF THE INVENTION

Accordingly, an object of the present invention is to provide an improved light beam scanning system for eliminating deviations perpendicular to the scanning direction of the scan line due to parallelism deviations of the rotary multi-surfaced mirror.

According to the present invention, for eliminating deviations of the scan line due to the parallelism deviations of the rotary multi-surfaced mirror, lenses having relatively long focal lengths can be used without requiring lenses having short focal lengths. It is easy to produce a long focal length lens with high quality. The depth of focus thereof is quite wide. Therefore, it is possible to reduce the variation of the convergence of the light beam due to displacement of the reflection point of the light beam during rotation of the reflection surface of the rotary multi-surfaced mirror.

A light beam scanning system using rotary multisurfaced mirror according to the present invention includes a uni-directional convergent optical element for converging the incident light and for forming on the reflecting surface of the rotary multi-surfaced mirror a first linear image parallel to the scanning direction of the light beams reflected from the rotary mult-surfaced mirror, a first convergent optical system for converging the reflected light beams from the reflecting surface and forming a second linear image perpendicular to the scanning direction, a uni-directional divergent optical element disposed at an opposite position to the first convergent optical system with respect to the second linear image for diverging the light beam in a direction perpendicular to the scanning direction, and a second convergent optical system for converging the light beam and forming a point image on the scanning surface.

Object and image point relationships are established between the second linear image and the point image in the scanning direction and between the first linear image and the point image in the direction perpendicular to the scanning direction, respectively.

As used with the present invention, the uni-directional convergent optical element is typically a convex cylindrical lens. The element may be convex anamorphic lens, a convex toroidal lens, a concave parabolic cylindrical mirror, a concave cylindrical mirror or like.

As used with the present invention, the uni-directional divergent optical element is typically a concave cylindrical lens. The element may be a concave anamorphic lens, a concave toroidal lens, a convex parabolic cylindrical mirror or the like.

Convergent optical systems of the present invention include typically a spherical lens, a parabolic mirror, a spherical mirror or a combined optical system of such elements.

BRIEF DESCRIPTION OF THE DRAWINGS

The present invention will be hereinafter described with reference to the accompanying drawings in which:

FIGS. 1(A) and 1(B) are exploded views of a prior art optical scanner system showing states of a light beam from a rotary multi-surfaced mirror in a scanning direction thereof and in a direction perpendicular to the scanning direction, respectively;

FIGS. 2(A) and 2(B) are exploded views of another prior art optical scanner system showing states of a light beam from a rotary multi-surfaced mirror in a scanning direction thereof and in a direction perpendicular to the scanning direction, respectively; and FIGS. 3(A) and 3(B) are exploded views of an optical scanner system according to the present invention showing states of a light beam from a rotary multi-surfaced mirror in a scanning direction thereof and a direction perpendicular to the scanning direction, respectively.

DETAILED DESCRIPTION OF THE PREFERRED EMBODIMENT

FIGS. 3(A) and 3(B) are illustrations of the present invention in which FIG. 3(A) shows states of the light beams in a scanning direction of a rotary multi-surfaced mirror and FIG. 3(B) shows the same in a direction perpendicular to the scanning direction. The light beams are converged only in a direction perpendicular to the scanning direction by the multi-surfaced mirror by use of a cylindrical lens 31 to thereby form a first linear image parallel to the scanning direction on reflection surface 35 of the rotary multi-surfaced mirror. The light beam reflected by the reflection surface 35 is converged by a first convergent lens 33 to form a second linear image normal to the scanning direction on a plane 37. Then the light beams are diverged in a direction perpendicular to the scanning direction by a concave cylindrical lens 32 so that the light beams subsequently diverge from points on the plane 37. These beams are converged by a second convergent lens 34 to form a point image on a scanning surface 36. In this case, the first linear image on the reflection surface 35 and the point image on the scanning surface 36 are positioned at conjugate planes in the direction perpendicular to the scanning direction. For this reason, even if the direction of the light beam reflected by the light beam reflected by the reflection surface 35 is changed due to a parallelism error, the light beam is converged into a constant position in a direction perpendicular to the scanning direction on the scanning surface so that the scan lines are in coincidence with each other along their entire loci.

There is no positional limitation upon the focal distances $f_{31}$, $f_{32}$ of the convex and concave cylindrical lenses in regard to the first convergent lens. Only the following inequality must be satisfied since the concave cylindrical lens 32 is disposed between the plane 37 and the second convergent lens 34:

$$f_{32} < 2 f_{34}. \tag{3a}$$

In order to form the circular point images on the scanning surface 36, the following relationship must be satisfied:

$$f_{31} \cdot f_{32} = f_{33}^2 \tag{3b}$$

where $f_{31}$ is the focal length of the convex cylindrical lens 31, $f_{32}$ is the focal length of the concave cylindrical lens 32, $f_{33}$ is the focal length of the first convergent lens, and $f_{34}$ is the focal length of the second convergent lens.

In the same manner as the prior art systems, when $f_{33} = 50$ mm, if $f_{33} = 50$ mm, $f_{31}$ and $f_{32}$ can also both be 50 mm. It is thus possible to substantially elongate the focal lengths of the convex and concave cylindrical lenses. Accordingly, the difficulties involved with lenses having a short focal length are eliminated. The depths of focus of lenses used with the invention can be quite long. In the scanning direction, the linear image on the plane 37 and the point image focussed on the scanning surface have a fixed relationship of the object and image points. If an equimultiple relationship exists therebetween, the same scanning length as on the plane 37 is obtained on the scanning surface 36.

As stated above, the present invention is directed to a light beam scanning system for elimination the deviations in direction perpendicular to the scanning direction of the scan line due to the parallelism deviations caused by the rotary multi-surfaced mirror. The following advantages are provided.

According to the present invention, a long focal length lens can be used without requiring a corresponding short focal length lens. For this reason, the cost of a system embodiying the invention is reduced as it is easy to manufacture cylindrical lenses having a long focal length with high quality. At the same time, the depth of focus can be increased so that variations in the convergent states due to displacement of the reflection position of the light beam can be reduced.

According to the present invention, detection of positions in the scanning direction of the rotary multi-surfaced mirror is facilitated. The detection of positions in the scanning direction is necessitated for correction or compensation for angular division errors (which occur in adjacent surfaces forming an angle) generated during manufacture of the rotary multisurfaced mirror. For this, a method may be used in which signals are optically produced at a constant interval upon regions of the scanning surface or a surface equivalent to the scanning surface by use of light beams. These signals are then converted into electrical signals representing positions in the scanning direction. With these position indicating signals, it is possible to read and record information equidistantly on the scanning surface. According to the present invention, since no optical element is disposed between the first convergent lens 33 and the surface 37, a half mirror may be easily disposed therebetween. A lattice having a predetermined period with respect to the scanning direction is disposed at a surface equivalent to the plane 37 thereby providing for ready detection on the position-indicating signals in the scanning direction.

As described above, according to the present invention, when deviations of the scan line due to parallelism deviations of the rotary multi-surfaced mirror are eliminated, a short focal length lens is not required and only relatively long focal length lens need be used. As a result, a light beam scanner having a high performance is obtained.

The present invention is described with respect to specific embodiments. However, it is obvious that modifications of this invention can be made without departing from the scope thereof.

What is claimed is:

1. A light beam scanning system having a rotary multi-surfaced mirror comprising in order relative to a light source:
    (a) a uni-directional convergent optical element for converging an incident light beam to form on a reflection surface of said rotary multi-surfaced mirror a first linear image parallel to its scanning direction;
    (b) first convergent optical means for converging the light beam reflected by said multi-surfaced mirror to form a second linear image perpendicular to the scanning direction;
    (c) a uni-directional divergent optical element disposed at a position opposite to said first convergent optical means with respect to the second linear image, said divergent optical element being adapted to diverge the light beam in a direction perpendicular to the scanning direction; and
    (d) second convergent optical means for converging the light beam to form a point image on a scanning surface;
    whereby said second linear image and said point image are positioned at conjugate planes having a first object and image relationship in the direction parallel to the scanning direction while said first linear image and said point image are positioned at conjugate planes having a second object and image relationship in direction perpendicular to the scanning direction.

2. The light beam scanning system of claim 1 wherein said uni-directional convergent optical element comprises a convex cylindrical lens and said uni-directional divergent optical element comprises a concave cylindrical lens.

3. The light beam scanning system of either of claims 1 or 2 wherein the focal distances of said uni-directional divergent optical element is less than twice that of said second convergent optical means and the product of the focal distances of said uni-directional convergent optical element and said uni-directional divergent optical element are substantially equal to the square of the focal distance of said first convergent optical means.

* * * * *